Oct. 11, 1938. J. EHRLICH 2,132,726
INFINITELY VARIABLE TRANSMISSION
Filed July 19, 1933 4 Sheets-Sheet 2

Inventor
Jacob Ehrlich
By Blackmore, Spencer & Flint
Attorney

Oct. 11, 1938.        J. EHRLICH        2,132,726
INFINITELY VARIABLE TRANSMISSION
Filed July 19, 1933        4 Sheets-Sheet 3
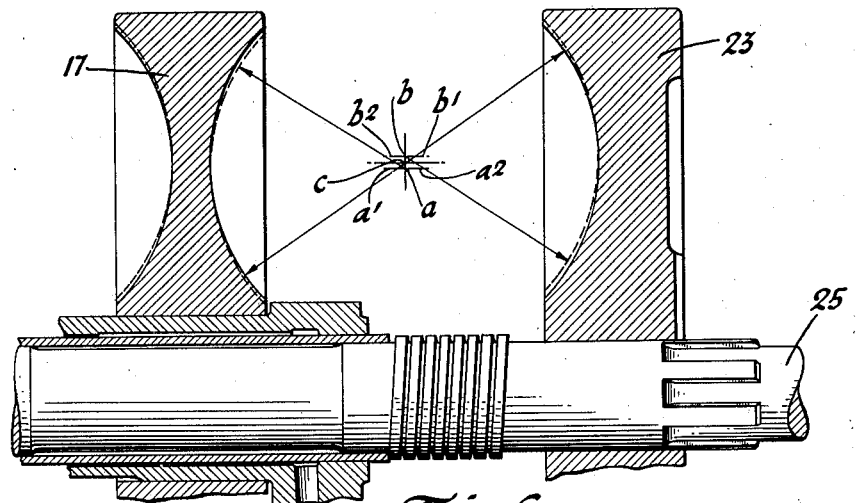
Fig. 6
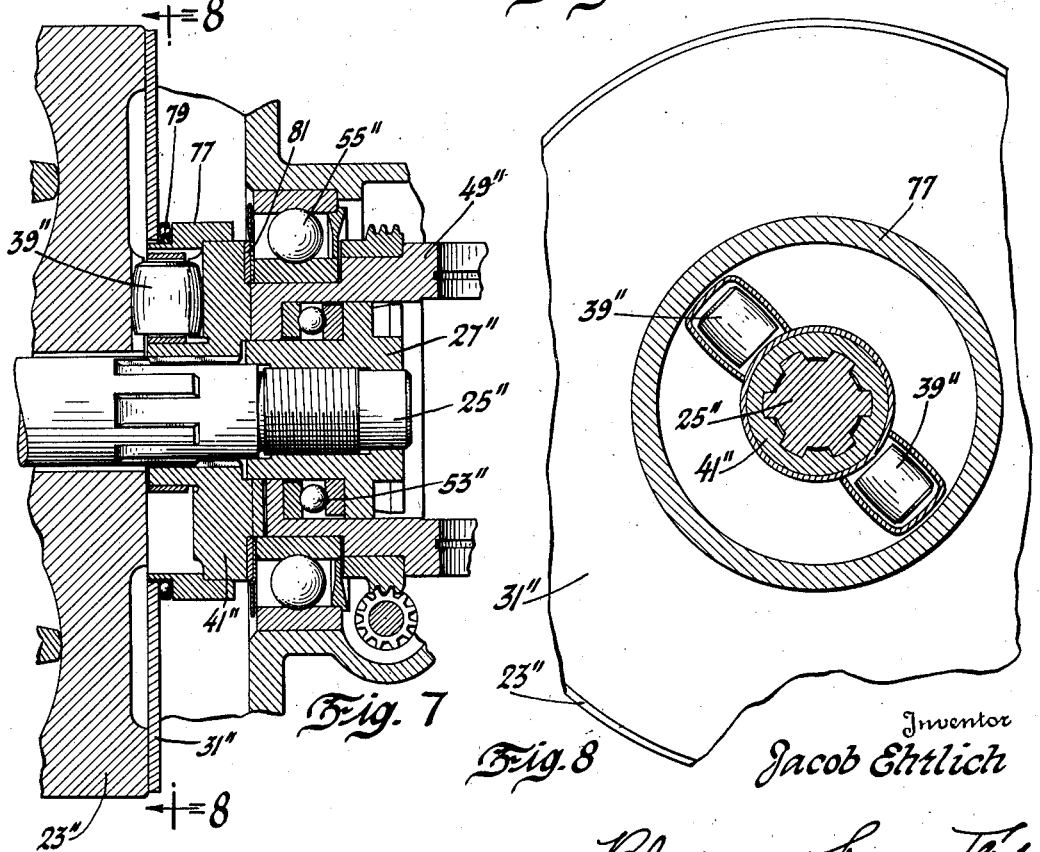
Fig. 7
Fig. 8
Inventor
Jacob Ehrlich
By Blackmore, Spencer & Flint
Attorneys

SERIES SPRING EFFECT

Patented Oct. 11, 1938

2,132,726

UNITED STATES PATENT OFFICE 2,132,726

INFINITELY VARIABLE TRANSMISSION

Jacob Ehrlich, Detroit, Mich., assignor, by mesne assignments, to General Motors Corporation, Detroit, Mich., a corporation of Delaware Application July 19, 1933, Serial No. 681,063

9 Claims. (Cl. 74—208)

This invention relates to friction transmission mechanism employing driving and driven races associated with input and output elements respectively and with rollers between said races engaging toric grooves therein, the rollers being mounted for tilting to change the driving ratios effected by the transmission.

The main object of the invention is to improve the durability and efficiency of such a transmission.

As a secondary object, defining the means by which the main object is attained, the invention aims to improve the mechanism by which the pressure between the races and rollers of the toric transmission is obtained. More specifically this involves an improvement over a known type of torque-responsive device to vary the axial pressure between the races of the transmission.

As a further object, the invention contemplates the use with the output element of the transmission of a roller and cam torque-loading device, the cam or cams having surfaces curvilinear in profile whereby the actual loading at the contacting surfaces between the driving and driven races and rollers may more closely approximate the most efficient loading.

The invention also aims to obtain better loading by the use with such a profile cam torque loader of a spring located in parallel with said torque loader, this type of torque loader permitting the use of a relatively light spring. In certain installations the invention may be embodied in a construction using a stiff spring in series with the torque loader; in other embodiments the surfaces of the toric races may be modified to "spread" the elements of the torque loader in certain driving ratio position; and in still another embodiment a light series spring may be used with a curvilinear profile cam torque loader either with a parallel spring or in the absence of a parallel spring.

Other objects and advantages will be understood from the following description.

In the drawings accompanying this description—

Figure 6 is a partial section of a third embodiment of the invention.

Figure 7 is a partial section of a fourth form of the invention.

Figure 8 is a section on line 8—8 of Figure 7.

Figure 1:
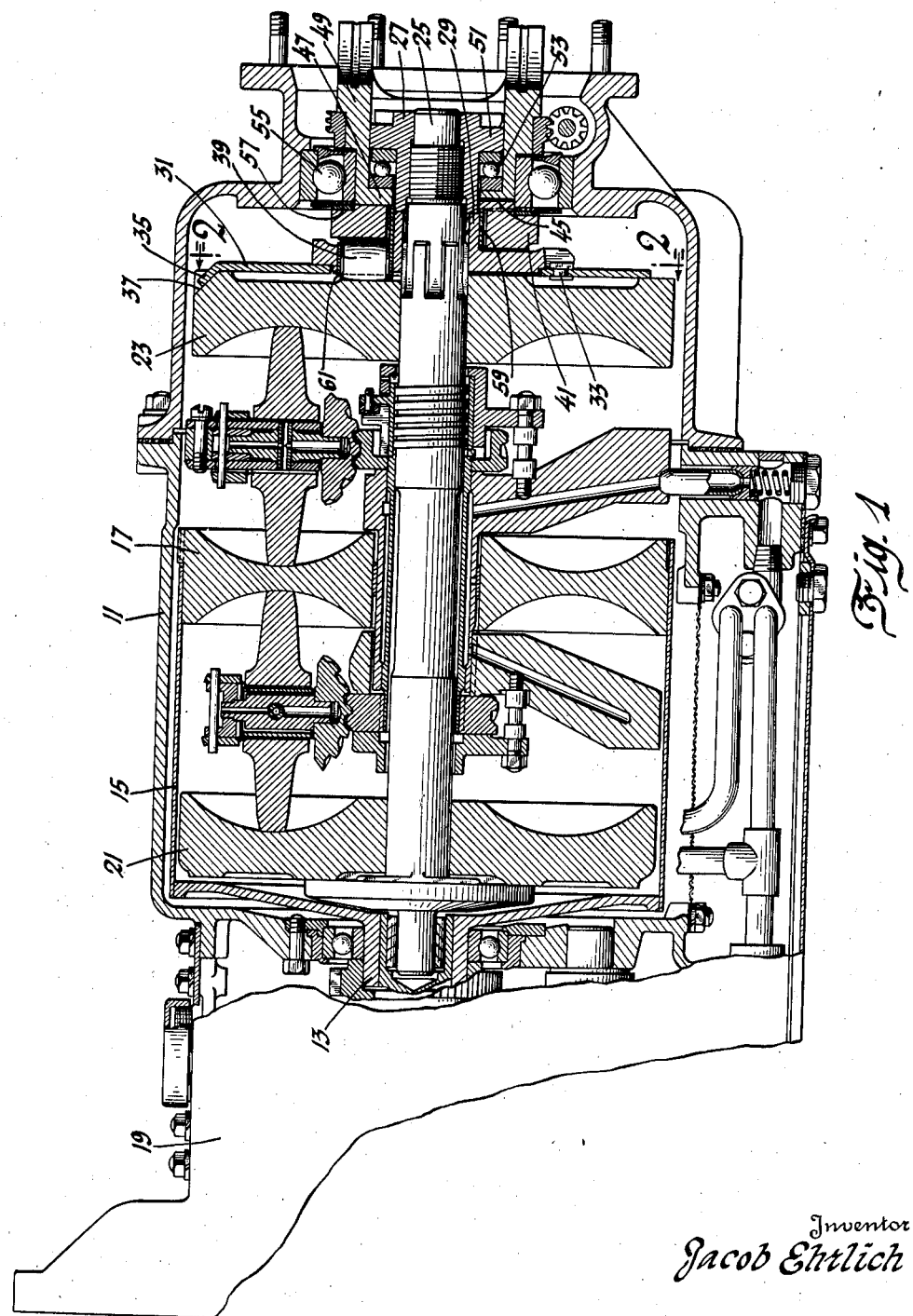
Figure 1 is a view showing in section a friction transmission having associated therewith one embodiment of my improved loading device.
Figure 2:
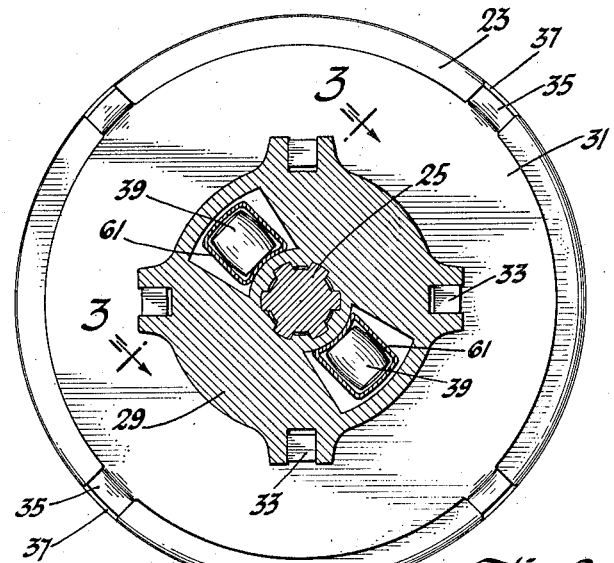
Figure 2 is a section on line 2—2 of Figure 1.

Referring by reference characters to Figure 1 of the drawings, numeral 11 represents the housing of the transmission. This housing receives an input element or shaft 13 provided with a cylindrical member 15, the latter operably connected to the periphery of an intermediate double race 17 having opposed toric grooves as shown. The input shaft 13 is rotated by any suitable source of power which operates preferably through a shiftable reversing gearing housed within casing 19. There are driven races 21 and 23 on a shaft 25 shown as coaxial with shaft 13. Race 21 is immovably secured to the shaft 25. Race 23 is mounted on shaft 25 for slight axial sliding.

The construction at the output end of the transmission is as follows: At the rear end of shaft 25 is a flanged nut 27 threaded thereon. The front end of nut 27 engages the hub portion of a collar 29 non-rotatably but slidably mounted on the shaft. A relatively light spring 31 normally of conical shape but flattened under pressure as shown in Figure 1 to have a relatively low rate is secured by fastening means 33 to the collar. At its outer periphery this spring has tongues 35 which are bent into notches 37 on the rear face of race 23. By this means spring 31 exercises pressure to hold the races and rollers in contact. It pushes race 23 and pulls upon race 21 (through the instrumentality of collar 29, nut 27, and shaft 25). Adjustment of collar 29 by means of the nut 27 determines the spring pressure.

Torque-loading rollers 39 mounted in openings in the collar 29 engage inclined surfaces on race 23 and on a spacing collar 41, the inclined surfaces being herein referred to as curvilinear in profile and represented by numeral 43. The collar 41 rotatably surrounds the hub portion of collar 29 and has a radially extended splined connection as at 45 with a flange 47 of a coupling member 49. Between the flange 47 of the coupling member and a radial flange 51 on the nut 27 which also engages coupling member 49 is a thrust bearing 53. It will be seen that the engagement of the flange 47 with the hub of the nut 27 and the engagement of the flange of the nut with the inner surface of the joint member serves to properly position the coupling member in such a way as to prevent any but axial thrusts from being delivered by the coupling member to the transmission. Around the outside of the coupling member and within the transmission casing are bearings 55. A flat spring 57 located as shown is in series with the torque-loading device. Its function in the organization disclosed is to avoid looseness when the device is not under load.

It is unnecessary to describe the mechanism for changing the position of the driving rollers between the races to change the driving ratio. This mechanism is not a part of this invention. It will be understood that when the opposed surfaces of the intermediate race are engaged by the rollers near the transmission axis the transmission parts are in low ratio position. When the parts of the intermediate race engaged by the rollers are remote from the axis, the transmission is in overdrive position.

Figure 3:
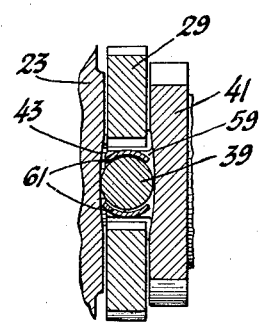
Figure 3 is a section on line 3—3 of Figure 2.
Figure 5:
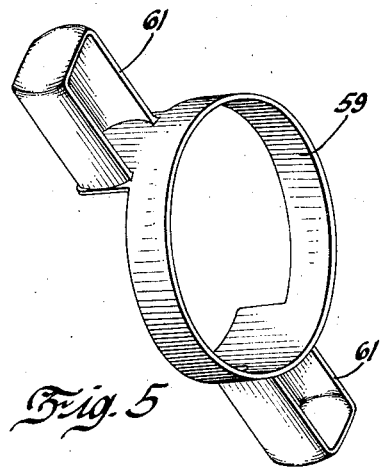
Figure 5 is a perspective of a detail.

A feature of importance concerns the mounting of the torque-loading rollers 39 and the shape of the surfaces on the opposed faces of the driven race 23 and the collar 41. A sleeve 59 (Figure 5) is located between the parts 29 and 41. Beyond these parts the sleeve is formed with opposite housings 61 for the rollers 39. The rollers are best described as being of barrel shape, this shape being seen by an inspection of Figure 1. The surfaces of the grooves on the face of the race 23 and the collar 41 are not flat as in the case of a plane V-slot, but are curved as shown by Figure 3. This departure from a V-slot as used in prior devices is herein referred to as constituting a curvilinear profile cam. The generating lines of the cam-producing surfaces on the parts 23 and 41 are elements parallel to a diameter, and these elements of the two cam surfaces are parallel under zero torque conditions. This curvilinear cam surface has the following advantages: In the case of plane face cams the increments of relative rotation between the parts constituting the torque-loading device are accompanied by equal increments of axial pressure. When the power-transmitting rollers between the toric races occupy planes substantially parallel to the axis of the transmission, the normal force between the rollers and races would be equal to the axial pressure derived from the torque-loading device. However, when the rollers depart appreciably from this plane toward low ratio position or toward high ratio position, the axial load required to produce the required normal load for the varying ratios need not be so great as the normal load. It is therefore possible to change the plane surface of the cam to a surface of curvilinear profile, the change being such as to make the curve of obtained axial pressure correspond more closely with the curve of required axial pressure.

Figure 11:
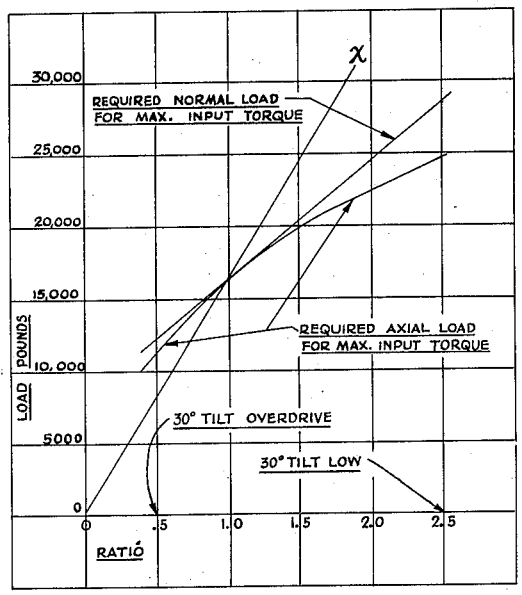
Figure 11 is a diagrammatic view showing by an illustrative example the relation between the required normal pressure between races and rollers and the required axial pressure to produce said normal pressure for the range between low ratio and overdrive for maximum input torque.

To aid in understanding the cam face correction reference is made to Figure 11. On this figure a suitably marked line shows the required normal load for maximum input torque between a 30 degree angular position of the roller at overdrive where the ratio is .5 and a 30 degree angular position for low ratio where the ratio is 2.5. The diagram shows also a curve representing the axial pressure necessary to provide the required normal pressures. The two curves have a point in common on the 1:1 ratio as they should be because this represents the position assumed by the rollers when they define planes parallel with the axis for which position the axial load equals the normal load. Line OX has been drawn to show the effect of torque loading only, the loading accomplished by a plane-faced cam. The line is straight, not curvilinear, because of the plane face of the cam. It intersects the origin O because the torque-loading device only is relied on to produce pressure. The line has been drawn to intersect the curve of required axial pressure on the 1:1 ratio line. It will be understood that the cam slope is designed to produce the line OX as described. The line clearly shows that this means of getting the loading between rollers and races gives pressures in excess of the required pressures for positions of the rollers between the 1:1 ratio position and the low ratio position, but that the pressures are too low between the 1:1 ratio position and the overdrive position. The rollers would therefore slip as the driving ratio shifted toward overdrive. To provide the necessary pressure at the overdrive the cam of the torque loader must be given a steeper slope so that the curve OX will be changed to an extent such that the pressure at overdrive equals at least the pressure shown by the curve of required axial pressure. This change would give excessive pressures throughout the range of driving ratios becoming very greatly in excess of the needed pressure as the ratio approached low. The present invention aims to prevent these excessive pressures. If a suitable pressure is present for overdrive and if the face of the torque-loading cam is suitably curved the line representing obtained axial pressures will be not a straight line but a curved line which may be made to correspond quite closely to the line of required axial pressure as shown on the diagram.

This change from a plane face torque-loading cam to a curvilinear profile is of great importance. In the case of transmission parts using hardened surfaces such as heat-treated steel, the life of the parts varies inversely as the cube of contact pressure. Obviously, therefore, a correction of cam contour in the torque-loading device which will aid in avoiding excessive pressures is of utmost importance. The cam-loading device of this application is so designed as to give all necessary normal pressures to prevent slipping under the highest torque at the lowest driving ratio, but to avoid high pressures which produce excessive wear and short life.

Figure 12:
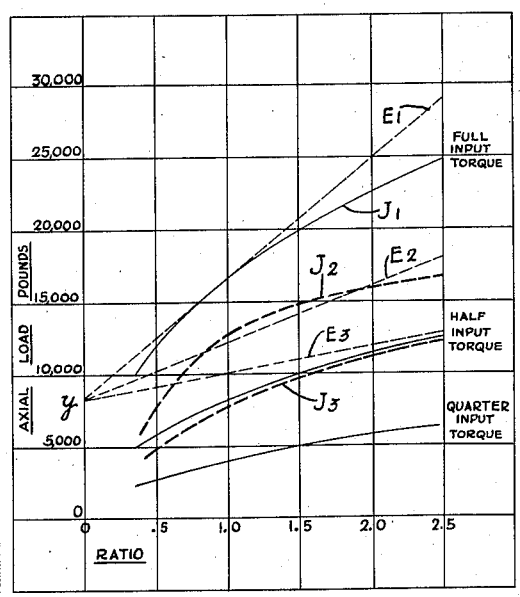
Figure 12 is a diagrammatic view showing the approximation to the required axial load obtained by the improvements in accordance with this invention.

It may be explained that the problem of avoiding unnecessarily high pressures has not been altogether neglected in the past when torque-loading has been effected by plane-faced cams. It may be an aid in understanding the present invention if brief reference is made to the prior efforts to the accomplishment of that end. Briefly there has been used a somewhat stiff spring, a preloaded spring exerting a pressure of substantially 8400 pounds in parallel with the plane face torque loader. Figure 12 shows a line marked "full input torque". This line represents the required axial pressure for full input torque as will be seen by comparing Figure 12 with Figure 11. It is clear that for high ratio driving an axial pressure of something in excess of 10,000 pounds is required. If an 8400 pound spring in parallel with the torque loader is used, it will be appreciated that the straight line representing the combined effect of this spring and the torque-loading device with a plane-faced cam should intersect the line representing axial loads at 8400. This point on Figure 12 is marked $y$. Now, as explained before, the straight line must have a point in common with the curve of required axial pressure at the 1:1 ratio point. The line $E_1$ is thus determined. It will be seen by this design that the new obtained axial pressure line $E_1$ gives only slightly excessive pressure for high ratio and far less excessive pressures at low ratio than in the case where the spring was not used. Figure 12 also shows the required axial load for half and quarter input torque. It will be seen that the lines $E_2$ and $E_3$ represent the obtained axial load lines for half and quarter input torque condition resulting from the 8400 pound spring and the flat cam. The limitations of this known use of a rather stiff spring with a plane face torque loader are seen from this diagram. For full input torque the excess loading, while slight at high ratio, is considerable for low ratio. For half and quarter input torque conditions, not only is there a considerably excessive load for low ratio but for high ratio the pressure of the 8400 pound spring introduces much higher loading than is necessary. This is particularly bad because vehicles when equipped with this transmission will be driven for the most part in the higher ratios.

My construction shown by Figure 1 overcomes to a considerable extent these defects. In Figure 1 spring 31 is not a heavy 8400 pound spring. It is a rather light spring of about 2000 pound pressure. A brief description of the spring may be introduced at this point in the description. Spring 31 is preferably of the Belleville washer type. It is of conical form in its free unstressed state. As shown, the cone is preloaded and flattened. It is preferably of such proportions as to exert substantially uniform pressure throughout the range of action of the torque-loading device. It may be defined as an initially dished spring of uniform thickness and so proportioned as to the relation between its thickness and the height of its cone as to have an approximately zero rate. Such a spring permits the torque-loading device to become effective in determining obtained axial loading at pressures above 2000. That it should be arranged to do so is evident from Figure 12 where the half and quarter input torque axial loading lines for high ratio indicate a required loading of 5000 pounds and less. It will be remembered that with plane faced cam loading it was necessary to use the high pressure spring (8500 pound) to avoid excessive obtained pressure at low ratio. With the light spring and the curvilinear profile cam the curve of obtained axial loading for full input torque $J_1$ may be made to conform almost precisely to the curve of required axial loading. For half and quarter input torque the obtained axial loading with the relatively light parallel spring and profile cam $J_2$ and $J_3$, will be seen to be somewhat in excess of the required loading for low ratio but will be seen to be but slightly in excess of the required loading at high ratio, the ratio normally used during the greater part of the time. Such a modification of prior devices using profile cam torque loading with the output element therefore makes possible the use of a relatively light spring in parallel therewith instead of a rather heavy spring and the combination of the curvilinear profile cam torque loader with the light spring makes possible an obtained loading much more closely approximating the required loading for all ratios than has heretofore been possible. The advantages in the avoidance of undue wear and in providing long life will be appreciated.

Another departure from prior devices is the omission of a radial splined connection between the race 23 and the part 29. The torque between these parts is now transmitted through the spring 31. There is thus avoided the friction in the region of the splines heretofore used, which friction has a tendency to interfere with the response on the part of the torque-loading device to changes in torque. By reducing the frictional resistance, loading is more definite and the loading cam may be designed to agree more closely with the requirements than for the case wherein there exists considerable friction. In that latter case it is necessary to design for a higher margin of overload to ensure adequate loading.

Another structural feature should be described. It relates to the housing for the torque-loading roller. Each housing 61 closely confines a barrel-shaped torque-loading roller. This arrangement prevents any rotation of the torque-loading roller about its points of contact with the two cams. Furthermore, the barrel shape of the roller is of particular importance. Since the corresponding elements of the mating cam faces on race 23 and collar 41 move out of parallelism when relative rotation occurs, the contact between the roller member and the cam faces would tend to cause crushing loads at the radially outermost ends of the roller if cylindrical rollers were used. To avoid such crushing loads, the barrel shape is employed and the contour of the roller is so designed that no portion of the radially outer end zone of the roller contacts with the cam face.

Figure 4:
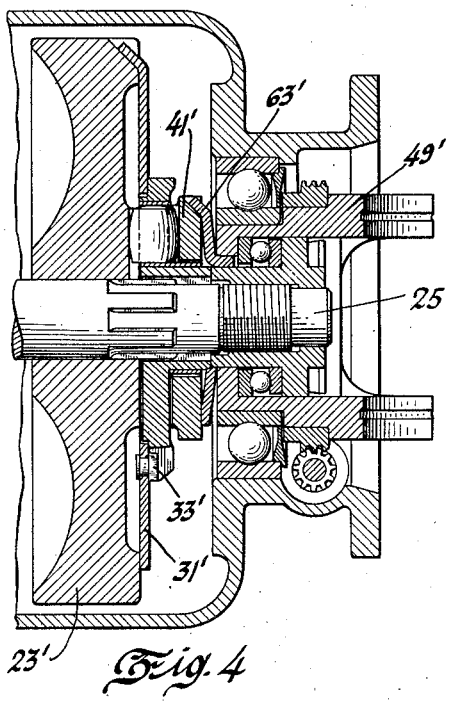
Figure 4 shows a partial section of a second form which the invention may assume.
Figure 9:
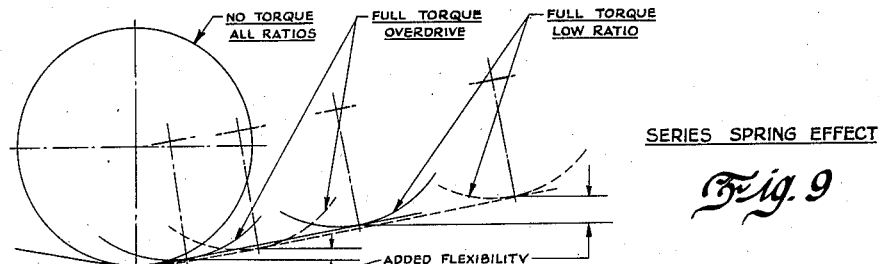
Figure 9 is a diagrammatic view illustrating successive positions of the torque-loading mechanism in the embodiment shown by Figure 4.

The operation of the loading device as described above depends upon the flexibility of the elements constituting the transmission. The torque-loading rollers engage the cam faces of race 23 and the collar 41. The race 23 is held from movement by its engagement with a driving roller, and the collar 41 is held by the nut 27 secured to the shaft as explained above. Assuming that the torque-loading roller is within the bottom of the groove of the cams, only by axial flexibility of the transmission elements can this roller reach higher regions on the cam faces. Moreover, unless there be considerable flexibility, it will be evident that the shape of the cam faces must be quite steep in order to get the torque-loading roller on the higher parts of the cam surface required for the changing driving ratios. This obviously makes necessary relatively greater precision in the cam design, and slight errors are much more serious than would be the case were it possible to make the slope of the cam surfaces more gradual. It is to permit the use of such a longer slope that the form shown by Figure 4 has been designed. In this form the corresponding parts are substantially similar to those described in connection with Figure 1 and are identified by similar reference characters. In addition to the structure therein shown, there is employed a relatively stiff spring 63' which is in series with the torque loader and is intended to yield under axial pressures. This makes it possible to "spread" the sloping surfaces of the torque-loading device over longer arcs. To make clear the effect of adding the spring 63', there has been added to the drawings a diagrammatic view, Figure 9. From this figure will be seen that the words "added flexibility" and the lead lines therefrom indicate a rough measure of the separation of the two cam-carrying members 23' and 41', due to the flexing of the series spring. The figure also shows by the arcs the changed position of the torque-loading rollers in reaching positions to produce the required axial pressure. This is shown for the low ratio and for the overdrive position wherein full torque is effective. The advanced position of the rollers due to the flexure of the spring clearly shows how a more gradual slope of cam may be used.

Figure 10:
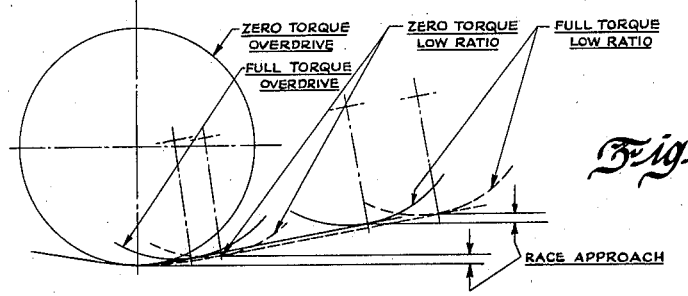
Figure 10 is a diagrammatic view similarly related to the form of invention shown by Figure 6.

There is another way in which a substitute for axial elongation due to flexibility of the elements of the transmission may be provided in cases where the transmission elements possess considerable rigidity. This expedient is shown by Figure 6. The contour of the grooves in the driving races has been changed. The center of curvature of the groove on the driving race (in this case race 17) is nearer the axis of the transmission than that of the groove of the driven race. The center of rotation of the roller between the races is located between the centers of the two grooves. In consequence, when the roller between the races is shifted from an overdrive to a low speed ratio the races may approach each other and this approach permits the separation of the cam faces of the torque-loading device on the race 23 and the collar 41, thereby making possible the elongated sloping region on the cams. By this means the effect of slight errors in the cam surfaces of the torque-loading device designed to produce axial pressures corresponding to the several ratio positions of the rollers is minimized. The center of the toric groove on the driving race is marked by the letter $a$ and the center of the groove on the driven race is marked by letter $b$. The center of the roller is marked by $c$. Letters $a^2$ and $b^2$ represent the centers of the grooves when the parts are in low ratio position, and $a^1$ $b^1$ represent the centers when the parts are in overdrive position. The changed position will be seen to indicate that the races are closer together for low ratio and are spaced apart for driving in overdrive. Thus when the ratio is shifted from overdrive to low, the centers move from $a^1$ to $a^2$ and from $b^1$ to $b^2$ whereby the races approach each other. This opens up the space between race 23 and collar 41 whereby any relative rotation between race 23 and collar 41 may take advantage of that part of the cam faces on these members designed to be associated with low ratio driving. In the diagrammatic view (Figure 10) it will be seen that in overdrive the roller is in the bottom of the valley for zero torque and engages an adjacent point for full torque. This figure also shows the zero torque low ratio position which is displaced from the valley of the cam because of the separation of race 23 and collar 41 as a result of the altered contour of the grooves on parts 17 and 23 as explained above. Full torque low ratio positions are also shown corresponding with the normal race contour and to the altered race curvature. For convenience, the "race approach" is indicated for both zero torque and full torque conditions of low ratio, this "race approach" determining the spacing of the race 23 and the collar 41 due to the altered race curvature.

By either of the arrangements described above axial pressures delivered by the torque-loading device may be brought into close conformity to the curve represented by Figure 11 which shows the required axial load for maximum input torque for driving ratios ranging from a 30° tilt for overdrive to a 30° tilt for low ratio. Such arrangements also produce axial pressures which deviate from the required axial loads for fractional input torque to an extent less than by expedients such as V-shaped cams with spring loading as explained above.

There is another characteristic which may be provided for with a curvilinear profile cam torque-loading device. At low ratio the rollers are not rotated at the peripheral speed they may be expected to assume at high ratio. At high peripheral speeds added pressure should be applied to offset a decreasing traction coefficient. Since the high speeds occur only at high ratio position it is planned to shape the cam face of the torque loader upon an assumed maximum traction coefficient which will prevail at high speeds in overdrive. The region of the cam corresponding with low ratio will be shaped to take into consideration the lower maximum speeds and consequently higher traction coefficient at the lower ratio and thereby avoid excessive pressures when driving in low ratio.

In Figure 7 is shown an embodiment of the invention illustrating the use of the curvilinear profile with what may be called single output torque loading. In this figure 23" is the output race. The parts 49", 27", 53", 55" are like the corresponding parts in Figure 1. Part 41" is mounted with no rotation relative to part 49" just as 41 is locked to 49 in Figure 1. Part 41" is, however, held from rotation relative to shaft 25", in this respect differing from the construction shown by Figure 1. In place of member 29 of Figure 1 an annular member 77 is carried by part 41". Anti-friction contact means 79 are provided on part 77 for engaging the inner ring portion of spring 31" carried by race 23", said spring being mounted in parallel relation to the torque-loading device constituted by the rollers 39" and the curvilinear profile cam faces on parts 23" and 41". This spring is of the relatively light pressure referred to above. There is also shown a light series spring at 81. With this design the input torque from the intermediate driving race (not shown in Figure 7 but shown at 17 in Figure 1) is transmitted by the rollers to race 23" and thence through the torque-loading device to the coupling 49" by means of the splined connection between 41" and 49". This portion of the output torque is thus used to apply loading pressure between the rollers and races. That part of the output torque coming from the forward driven race (not shown in Figure 7 but appearing as 21 in Figure 1) is transmitted through shaft 25" to part 41" and to 49" directly and has no part in providing the loading pressures. For this reason this form is characterized as single torque loading rather than double torque loading, an expression used as descriptive of Figure 1 where not only the output torque from race 23 is effective to produce pressure between the races and rollers but where the torque from race 21 operates through shaft 25, part 29, spring 31 to race 23 and thence through the torque loader to the coupling. Although in the form of the invention shown by Figure 7 only half the output torque is used, this may be sufficient for many installations to provide the necessary loading pressures.

This description has emphasized the very marked advantages of the curvilinear profile cam designed to produce an obtained axial loading approximating the required axial loading. It has been shown that the parallel spring should not be a high pressure spring. It may be said that fullest advantage of the loading to be obtained by a profile cam would appear to be obtained with the entire omission of the light parallel spring, reliance for initial pressure between races and rollers being ensured by a series spring such as spring 57 in Figure 1 or spring 81 of Figure 7. Particularly for light torque even better loading may be obtained in this way. If used in the double torque-loading arrangement of Figure 1 the omission of the parallel spring will require the substitution of the spline connection between race 23 and part 29, the function of which connection is taken by spring 31 in the form shown by Figure 1 as explained above. The advantage of the use of the profile cam with the single series spring may be somewhat offset by the friction in the spline connection referred to above. In the case of Figure 7, the single torque-loading type, spring 31" is not used to hold from relative rotation the end races 21 and 23, and the omission of the spring 31" requires no structural modification. For this form of single torque-loading it may well be that the omission of the parallel spring and reliance upon the shape of the cam of the torque loader together with the light series spring may prove to be very advantageous.

I claim:

1. In frictional transmission mechanism, input and output elements, driving and driven grooved races associated with said elements respectively, rollers operably positioned between said races, means to movably mount said rollers to vary the driving ratio, yielding means operable to press said rollers and races together, and a loading device comprising means responsive to output torque to produce pressure between said rollers and races, said loading device comprising cam means having a non-circular curvilinear profile, said yielding means and loading device being so constructed and arranged that the axial pressure produced thereby substantially corresponds with the axial pressures required for all driving positions of the rollers when driving under full torque.

2. In frictional transmission mechanism, input and output elements, driving and driven grooved races associated with said elements respectively, rollers operably positioned between said races, means to movably mount said rollers to vary the driving ratio, yielding means operable to press said rollers and races together, and a loading device comprising means responsive to output torque to produce pressure between said rollers and races, said loading device comprising opposed non-circular curvilinear cams and a roller to spread said cams upon relative rotary motion therebetween, said yielding means and loading device being so constructed and arranged that the axial pressure produced thereby substantially corresponds with the axial pressures required for all driving positions of the rollers when driving under full torque.

3. In frictional transmission mechanism, input and output elements, driving and driven grooved races associated with said elements respectively, rollers operably positioned between said races, means to movably mount said rollers to vary the driving ratio, yielding means operable to press said rollers and races together, and a loading device comprising means responsive to output torque to produce pressure between said rollers and races, said loading device comprising parts having opposed non-circular curvilinear concave surfaces and a roller between said surfaces to spread said parts upon relative rotary motion therebetween, said yielding means being yieldable under a load less than that existing at full torque and high ratio and said yielding means and loading device so constructed and arranged that the axial pressures produced thereby substantially correspond with the axial pressures required for all driving positions of the rollers when driving under full torque and whereby excess loading under fractional torque conditions is avoided.

4. In a transmission, input and output elements, driving and driven races associated with said elements respectively, said races having toric grooves, rollers between said races and engaging in said grooves, cam and roller means responsive to the torque of one of said elements to produce pressure between said races and rollers, the cam of said cam and roller means having a curvilinear profile and the centers of the grooves of the input and output races being unequally distant from the transmission axis.

5. In a transmission, input and output elements, driving and driven races associated with said elements respectively, said races having toric grooves, rollers between said races and engaging in said grooves, cam and roller means responsive to output torque to produce pressure between said races and rollers, the cam of said cam and roller means having a curvilinear profile and the centers of curvature of the grooves being unequally distant from the axis of the transmission whereby the parts of the loading device may be variably spaced in accordance with the movements of the rollers to change driving ratios.

6. In a transmission, input and output elements, driving and driven races associated with said elements respectively, said races having toric grooves, rollers between said races and engaging in said grooves, cam and roller means responsive to the torque of said output element to produce pressure between said races and rollers, the cam of said cam and roller means having a curvilinear profile and the center of curvature of the groove on the input shaft race being nearer the axis of the transmission than the center of curvature of the groove on the output race whereby the parts of the loading device may be spread in response to a movement of the driving rollers into low ratio position.

7. In a power transmission, input and output elements, driving and driven race elements carried by said elements, transmission rollers between said race elements, one of said elements comprising a pair of races rotatable in unison, a torque-loading device having one or more elements with a curvilinear cam face, said torque-loading device being engageable with and operable upon one of said races to draw together the pair of races which are rotatable in unison, said torque-loading device being responsive to output torque together with a light spring exerting pressure between said races and rollers and operable in parallel with said torque-loading device, and a spring in series with said torque-loading device.

8. In a power transmission, toric races and rollers therebetween, a torque-loading device for said transmission having a member with curvilinear profile cam surfaces and an interposed roller, and a light spring in series with said torque-loading device, said toric races including two driven races, said loading device being responsive to the torque of one only of said driven races.

9. In a transmission, input and output elements, driving and driven races associated with said elements respectively, said races having toric grooves, rollers between said races and engaging in said grooves, cam means responsive to the torque of one of said elements to produce pressure between said races and rollers, said cam means having a curvilinear profile, and the centers of the grooves of the input and output races being unequally distant from the transmission axis.

JACOB EHRLICH.